(12) United States Patent
Weyer

(10) Patent No.: US 6,463,466 B1
(45) Date of Patent: Oct. 8, 2002

(54) METHOD AND APPARATUS AND BUSINESS SYSTEM FOR ONLINE DISTRIBUTION OF SERIAL WORKS

(76) Inventor: Frank Michael Weyer, 264 S. La Cienega Blvd. #1224, Beverly Hills, CA (US) 90211

( * ) Notice: Subject to any disclaimer, the term of this patent is extended or adjusted under 35 U.S.C. 154(b) by 0 days.

(21) Appl. No.: 09/357,048

(22) Filed: Jul. 19, 1999

(51) Int. Cl.[7] .............................................. G06F 13/00
(52) U.S. Cl. ...................................... 709/217; 709/203
(58) Field of Search ................................. 709/200, 201, 709/203, 204, 205, 217, 218, 219

(56) References Cited

PUBLICATIONS

Digital Textbooks Aid Professors and Students, The Journal, May 1999.*
Hot off the wire; shopping for titles at the Online BookStore means downloading from the Internet, Computer Shopper, May 1993.*

* cited by examiner

Primary Examiner—Moustafa M. Meky
(74) Attorney, Agent, or Firm—Frank Weyer

(57) ABSTRACT

The present invention comprises a method for distributing a serial work such as a novel, story, book, or other single-media or multi-media serial work over a communications network such as the internet in a manner that provides the entire work to users for free, while still providing an incentive for users to purchase the work. Instead of distributing a limited (e.g. abridged) free version and a more complete paid-for version as in the prior art, in the present invention, the content of the free and the paid-for versions are substantially the same. The thing that is different, however, is the time period over which the entire work is delivered.

The present invention may be used with works that consist of serial data that can be divided into discrete portions. An example is a novel that is divided into chapters. In one embodiment of the invention, portions are provided for free to the users over a period of time. For example, a chapter of a novel may be provided every week for free, for example by being posted on an internet web site for downloading, by being sent to the user by e-mail, or by other appropriate methods. However, if the user wishes to obtain the work more quickly, the user can at any time pay to receive the entire work immediately. In one embodiment of the invention, the fee decreases with time, so that the fee to buy the entire work is dependent on the amount of the work not yet distributed for free.

20 Claims, 3 Drawing Sheets

METHOD AND APPARATUS AND BUSINESS SYSTEM FOR ONLINE DISTRIBUTION OF SERIAL WORKS

FIELD OF THE INVENTION

The present invention relates to the field of online publishing, and more particularly to a method, apparatus, and business system for online publishing and distribution of books and other serial works.

BACKGROUND

The internet enables the mass distribution of information and data, including copyrighted works such as pictures, written works, and computer programs. The term used for copying data from a server computer via the internet to a user's home computer is called "downloading".

Data that is available for downloading from the internet includes free data and data that must be paid for. A typical paradigm used by a business that supplies data over the internet is to provide a limited version of the data for free, and to provide a more full-featured version of the data for a fee. A typical example is software. Companies that distribute software over the internet typically provide a free version of a software program and a version that must be paid for. The free version often provides the same basic functionality as the paid-for version, but does not include all the bells and whistles of the paid-for version, or is operable for only a limited period of time. The marketing philosophy is to provide the free version to as many users as possible with the hope that a significant portion of them will like the program and want to upgrade to the more sophisticated features of the paid-for version.

Although the above-described system works well for data that comprises works such as software programs where the more sophisticated paid-for version provides distinct benefits over the free version, the prior art system does not work well for data that comprises works that are made of serial data such as a novel or a multimedia story. For this kind of data, although it is also possible to produce both limited (i.e. abridged) and complete versions, it is less likely that a user who uses (i.e. reads, hears, sees or otherwise experiences or perceives) a limited version of a novel or story will thereafter want to purchase the more detailed version, especially if the novel or story contains an element of suspense that is resolved at the end of both the abridged and full-length versions. If the user has already found out how the story unfolds from the abridged version, there is little motivation to pay for the full-length version of that novel or story.

It is possible to provide only a portion of the novel, book or other work to the user and require the user to pay to obtain the remaining portion. However, if works were distributed in this manner users would tend to be reluctant to invest their time in reading the free part of the work if they know that they will only learn how the story turns out if they pay to get the remaining part of the work.

What is needed is a method that allows the free distribution of a serial work such as a novel or story over the internet while still providing an incentive to purchase the same work.

SUMMARY OF THE INVENTION

The present invention comprises a method for distributing a serial work such as a novel, story, book, or other single-media or multi-media serial work over a communications network such as the internet in a manner that provides the entire work to users for free, while still providing an incentive for users to purchase the work. Instead of distributing a limited free version and a more complete paid-for version as in the prior art, in the present invention, the content of the free and the paid-for versions are substantially the same. The thing that is different, however, is the time period over which the entire work is delivered.

The present invention may be used with works that consist of serial data that can be divided into discrete portions. An example is a novel that is divided into chapters. In one embodiment of the invention, portions are provided for free to the users over a period of time. For example, a chapter of a novel may be provided every week for free, for example by being posted on an internet web site for downloading, by being sent to the user by e-mail, or by other appropriate methods. If a novel has fifty-two chapters, for example, it would take an entire year (52 weeks) to provide the entire novel to users for free.

If the user wishes to obtain the novel more quickly, however, the user can at any time pay to receive the entire novel immediately. The user is more apt to begin reading the free chapters of the novel because the user knows that the user can always, by waiting long enough, obtain the novel in its entirety for free. On the other hand, if the user desires, the user can get the entire novel immediately by paying a fee. In one embodiment of the invention, the fee decreases with time, so that the fee to buy the entire work is dependent on the amount of the work not yet distributed for free.

DETAILED DESCRIPTION OF THE INVENTION

The present invention comprises a method and apparatus for on-line distribution and sale of works consisting of discrete, serial sets of data. In the following description, numerous specific details are set forth in order to provide a thorough description of the invention. It will be apparent, however, to one skilled in the art that the invention may be practiced without these specific details. In other instances, well-known features have not been described in detail so as not to obscure the invention.

Figure 1:
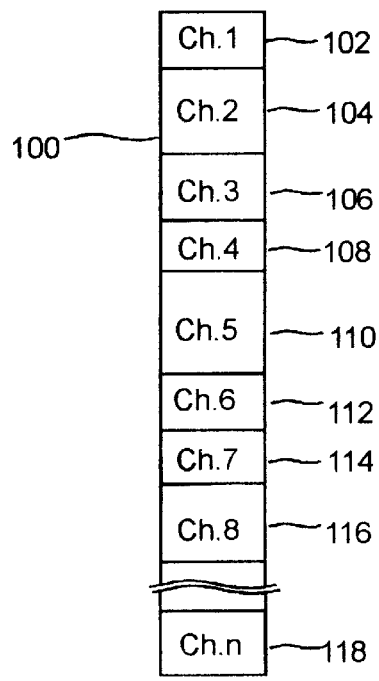
FIG. 1 is a schematic illustrating a work consisting of serial data that may be distributed using the method of the invention.

FIG. 1 is a schematic representation of an example of a serial work that may be used with embodiments of the invention. As used herein, "serial work" means any work that can be delivered to a user in distinct portions, which have an order, each of which can be utilized by the user by itself or in conjunction with earlier-delivered portions, but that typically require subsequent portions to be complete. A simple example of such a serial work is shown schematically in FIG. 1. The example serial work illustrated in FIG. 1 is a book 100 that is divided into an arbitrary number of chapters 1 to "n", indicated by reference numbers 102–118. As shown in FIG. 1, the chapters can each be of arbitrary size. The term "chapter" as used herein is not limited to formal chapter divisions of a book but means any sequence or set of text as may be selected by the distributor of the work. Similarly the term "part" as used herein with respect to a serial work means any serial segment of the work (it will be noted that a "chapter" of a book is an example of a "part" of a serial work). The only requirement is that each part can be delivered to the user separately from subsequent parts, and that no subsequent parts are needed for the user to use the newly delivered part. For example, upon receiving a chapter of a book, the user can immediately use (read) and enjoy the current chapter, without having to wait for subsequent chapters to be delivered. Of course the user will still need to receive the remaining chapters for the story to be complete, but he can make full use of the part that has been delivered as soon as it has been received.

Figure 2:
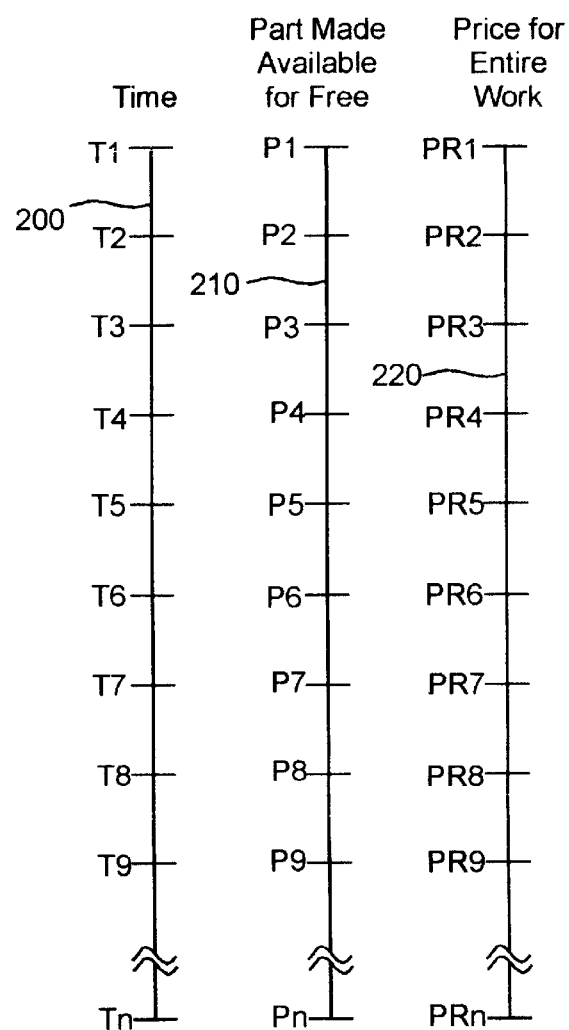
FIG. 2 is a time line diagram illustrating a relationship between time, the parts of the serial work that are delivered for free, and the price for obtaining the whole work in an embodiment of the invention.

FIG. 2 illustrates the relationship between the time period over which parts of a serial work are delivered in one embodiment of the invention. FIG. 2 consists of three parallel time lines 200, 210 and 220. Time line 200 is a timescale. In the embodiment of FIG. 2, timepoints T1 to Tn are indicated on timescale 200. Each of timepoints T1 to Tn represents a time point at which a new part of the serial work is distributed for free to one or more users. In the embodiment of FIG. 2, the periods of time between subsequent timepoints T1 to Tn are shown as being equal in length. However, the time periods between subsequent timepoints need not be the same and can each be of arbitrary length. In one embodiment, for example, the time between T1 and T2 is one week, while the time between T2 and T3 is ten days. In other embodiments, each of T1 to Tn falls on the first day of consecutive weeks, or on the first day of consecutive months, or on every third day, or on every fourth business day, etc.

The second timeline in FIG. 2, timeline 210, indicates the parts of the serial work that are delivered at each timepoints T1 to Tn indicated on timescale 200 in the embodiment of FIG. 2. As shown in FIG. 2, the first part of the serial work, P1, is delivered at time T1. The next part, P2, is delivered at time T2, part three, P3, is delivered at time T3, and so on, until the last part, Pn, is delivered at the final timepoint, Tn.

The parts of the serial work that are delivered at each timepoint may be delivered in any of a variety of delivery manners, including as part of or an attachment to an e-mail message, by being posted in downloadable form on a website, by being mailed to a recipient in electronic or printed form, by being broadcast via wired and/or wireless means, and/or in any other desired manner. In one or more embodiments, each time a part is delivered at a timepoint, all previously delivered parts are made available to the recipient as well. In one or more embodiments, the newly delivered part is appended to all previously delivered parts, such that the part being delivered is a combination of the new part and the previously delivered parts. In one or more embodiments, the new part is made available to the user either as a separate unit or combined with one or more previously delivered parts. In one or more embodiments, if delivered in electronic form, the part or parts being delivered may comprise a text file, a word processing document file (e.g. a Microsoft Word file), a read-only file (e.g. a PDF file), or have some other form.

In one or more embodiments of the invention, even though the user must wait for the arrival of the last delivery timepoint to obtain the whole work for free, the user may at any time purchase the parts needed to complete the entire work. In one or more embodiments, the user may request to receive the remaining parts of the work in the form of the work as a whole, or in the form of an assemblage of the not yet received parts, or in some other form.

In one or more embodiments, the purchase price for the entire work varies during the time during which parts of the work are being delivered for free. Timeline 220 in FIG. 2 shows the relation between the price for the entire work and the parts of the work that are delivered for free in one or more embodiments of the invention. As shown in FIG. 2, at timepoint T1 at which the first part, P1, of the work is made available, the price for the entire work is PR1. At timepoint T2, when part P2 is made available, the purchase price for the remainder of the work is PR2 (although the word "remainder" is sometimes used herein to refer to the portion of the work that is delivered for a cost, it will be understood that the remainder may be delivered to the user in the form of the entire work that includes both the remainder and the previously delivered chapters.) At timepoint T3, the price is PR3, and so on until at time Tn the price is PRn. In one or more embodiments, PRn is equal to zero. In one or more embodiments of the invention, in addition or as an alternative to being able to purchase the entire work, or the remaining parts of the work, a user may also be given the option of purchasing only a portion of the remaining parts of the work. For example, in one embodiment, the user may purchase the work in groups of four parts at a time.

In one or more embodiments encryption or other security features may be used to limit the copying of the parts of the work that are delivered to users. In one or more embodiments the work (in whole or in part) is delivered in a form that requires special software (e.g. a browser plug-in or Adobe Acrobat Reader) for the user to view the parts of the work that have been delivered. In one or more embodiments the user must register with a web site and obtain a logon name and password prior to being allowed to receive the parts of the work being provided for free.

Figure 3:
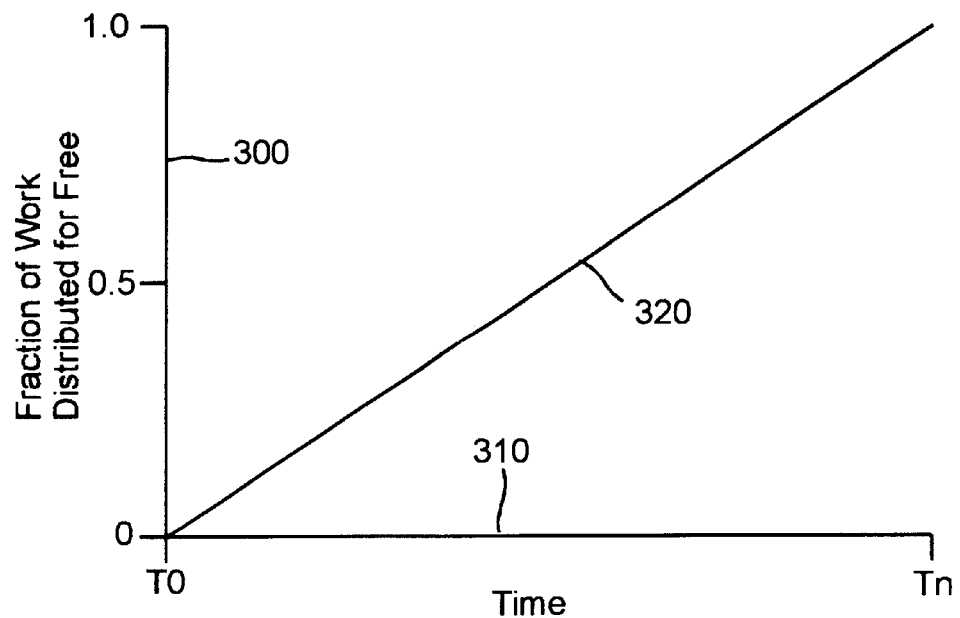
FIG. 3 is a graph illustrating a relationship between time and the fraction of a serial work distributed for free in an embodiment of the invention.
Figure 4:
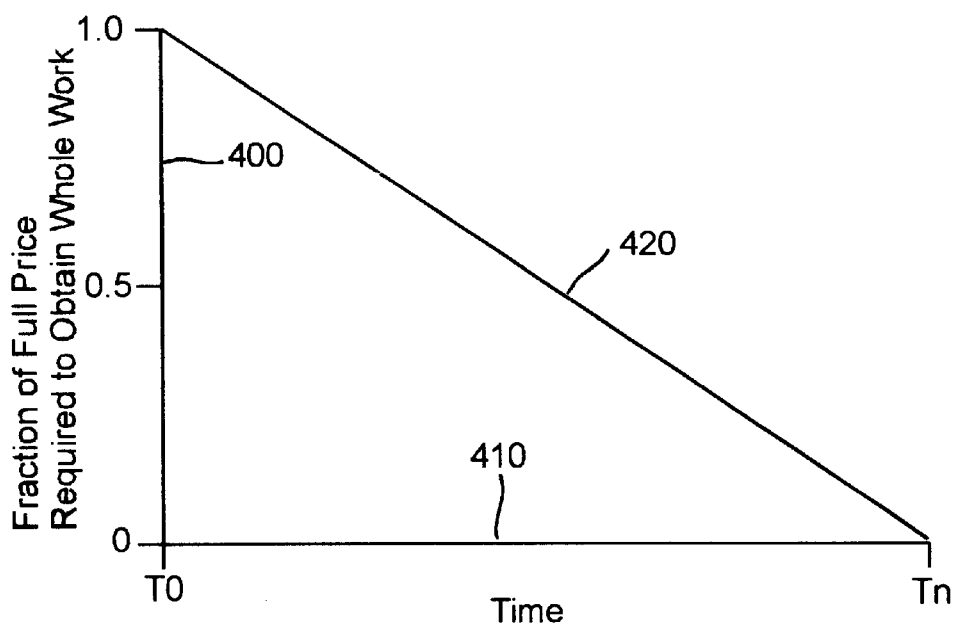
FIG. 4 is a graph illustrating a relationship between time and the price for obtaining the whole work in an embodiment of the invention.

In one or more embodiments the purchase price for the entire work decreases over time, while the portion of the work delivered for free increases over time, as shown generally in FIGS. 3 and 4. FIG. 3 is a graph illustrating a simplified relationship between the fraction of the work distributed for free (represented by the y-axis 300) and time (represented by the x-axis 310). FIG. 4 is a graph illustrating a simplified relationship between the fraction of the full price required to obtain the whole (or remaining portion) of the work (represented by the y-axis 400) and time (represented by the x-axis 410). As shown in FIG. 3, in this embodiment, the fraction delivered for free increases steadily from 0 at time T0 to 1.0 (i.e. the whole work has been delivered) at time Tn. As shown in FIG. 4, in this embodiment, the fraction of the full price payable to obtain the whole work decreases steadily from 1.0 at time T0 (i.e. the full price) to zero at time Tn.

In other embodiments, the relationship between the price to obtain the whole work, PR, and time may be more complex than as in the embodiment of FIG. 4. For example, the initial price may be set low as an incentive for users to purchase the entire work early, then rise for a period of time before decreasing again. In one or more embodiments, the price reaches a value other than zero at time Tn. In one or more embodiments, the price varies according to the form in which the work is delivered. For example, the price may be less for a work delivered in electronic form than a work delivered in hard copy. In one or more embodiments in which the work is a book, the price for delivery in electronic form generally decreases while the price for delivery in the form of a printed book decreases more slowly or remains substantially the same. In one or more embodiments, the price for the remaining part of the work (or the work as a whole) may increase over certain periods of time.

Revenue may be generated by the method of the invention in a number of ways, including from purchases of remaining parts of the work not yet distributed for free, from purchases of the work in different form from the manner it is being distributed for free (e.g. hard copy book vs. electronic version), from sale of related items (merchandise, film rights, film script), or from sale of subsequent works that are not distributed for free. In addition, the method of the invention may be used as a promotional vehicle to attract users to a web site. For example, a web site that sells books may distribute some books according to the method of the invention while distributing other books in a conventional manner.

The present invention may be implemented, for example, in the form of a web site. The setting up of a web site implementing the method of the invention will be apparent to those skilled in the art from the teachings herein.

Figure 5:
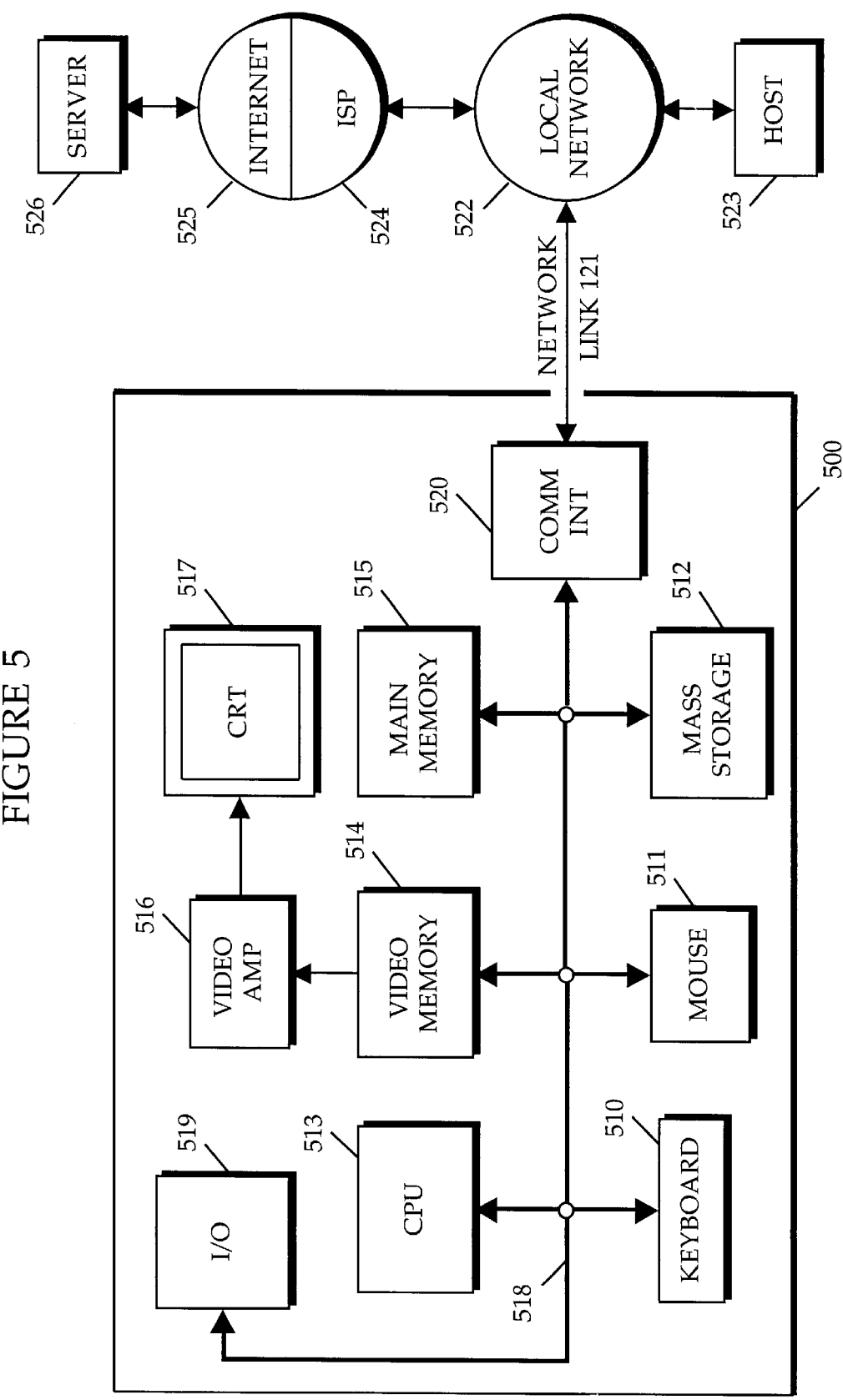
FIG. 5 is a block diagram of a computer system that may be used with one or more embodiments of the invention.

FIG. 5 is a block diagram of a computer system that may be used with one or more embodiments of the invention. An embodiment of the invention can be implemented as computer software in the form of computer readable code executed on a general purpose computer such as computer 500 illustrated in FIG. 5, or in the form of bytecode class files executable within a Java ™runtime environment running on such a computer, or in the form of bytecodes running on a processor (or devices enabled to process bytecodes) existing in a distributed environment (e.g., one or more processors on a network). A keyboard 510 and mouse 511 are coupled to a system bus 518. The keyboard and mouse are for introducing user input to the computer system and communicating that user input to processor 513. Other suitable input devices may be used in addition to, or in place of, the mouse 511 and keyboard 510. I/O (input/output) unit 519 coupled to system bus 518 represents such I/O elements as a printer, A/V (audio/video) I/O, etc.

Computer 500 includes a video memory 514, main memory 515 and mass storage 512, all coupled to system bus 518 along with keyboard 510, mouse 511 and processor 513. The mass storage 512 may include both fixed and removable media, such as magnetic, optical or magnetic optical storage systems or any other available mass storage technology. Bus 518 may contain, for example, thirty-two address lines for addressing video memory 514 or main memory 515. The system bus 518 also includes, for example, a 64bit data bus for transferring data between and among the components, such as processor 513, main memory 515, video memory 514 and mass storage 512. Alternatively, multiplex data/address lines may be used instead of separate data and address lines.

In one embodiment of the invention, the processor 513 is a microprocessor manufactured by Sun Microsystems, Inc., such as the SPARC™microprocessor, or a microprocessor manufactured by Motorola, such as the 680X0 processor, or a microprocessor manufactured by Intel, such as the 80X86, or Pentium processor. However, any other suitable microprocessor or microcomputer may be utilized. Main memory 515 is comprised of dynamic random access memory (DRAM). Video memory 514 is a dual-ported video random access memory. One port of the video memory 514 is coupled to video amplifier 516. The video amplifier 516 is used to drive the cathode ray tube (CRT) raster monitor 517. Video amplifier 516 is well known in the art and may be implemented by any suitable apparatus. This circuitry converts pixel data stored in video memory 514 to a raster signal suitable for use by monitor 517. Monitor 517 is a type of monitor suitable for displaying graphic images.

Computer 500 may also include a communication interface 520 coupled to bus 518. Communication interface 520 provides a two-way data communication coupling via a network link 521 to a local network 522. For example, if communication interface 520 is an integrated services digital network (ISDN) card or a modem, communication interface 520 provides a data communication connection to the corresponding type of telephone line, which comprises part of network link 521. If communication interface 520 is a local area network (LAN) card, communication interface 520 provides a data communication connection via network link 521 to a compatible LAN. Wireless links are also possible. In any such implementation, communication interface 520 sends and receives electrical, electromagnetic or optical signals which carry digital data streams representing various types of information.

Network link 521 typically provides data communication through one or more networks to other data devices. For example, network link 521 may provide a connection through local network 522 to local server computer 523 or to data equipment operated by an Internet Service Provider (ISP) 524. ISP 524 in turn provides data communication services through the world wide packet data communication network now commonly referred to as the "Internet" 525. Local network 522 and Internet 525 both use electrical, electromagnetic or optical signals which carry digital data streams. The signals through the various networks and the signals on network link 521 and through communication interface 520, which carry the digital data to and from computer 500, are exemplary forms of carrier waves transporting the information.

Computer 500 can send messages and receive data, including program code, through the network(s), network link 521, and communication interface 520. In the Internet example, remote server computer 526 might transmit a requested code for an application program through Internet 525, ISP 524, local network 522 and communication interface 520. In accord with the invention, one such downloaded application is the apparatus for selecting attachments described herein.

The received code may be executed by processor 513 as it is received, and/or stored in mass storage 512, or other non-volatile storage for later execution. In this manner, computer 500 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, a method, apparatus and business system for distributing serial works has been disclosed. Although the invention has been described using certain specific examples, it will be apparent to those skilled in the art that the invention is not limited to these few examples, but is defined by the full scope of the claims.

What is claimed is:

1. A method for distributing a work comprising a plurality of consecutive parts to a user comprising the steps of:

providing said parts consecutively over time in a first form to users for free such that said user receives said entire work for free after passage of a first period of time; and providing said work in its entirety to users prior to said passage of said first period of time for a first fee.

2. The method of claim 1 wherein said first fee varies over time.

3. The method of claim 1 wherein said first fee decreases over said first period of time.

4. The method of claim 3 wherein said first fee increases over a second period of time.

5. The method of claim 4 wherein said second period of time precedes said first period of time.

6. The method of claim 4 wherein said second period of time follows said first period of time.

7. The method of claim 1 wherein said consecutive parts are provided at discrete timepoints separated by time intervals.

8. The method of claim 7 wherein said time intervals are approximately of equal duration.

9. The method of claim 7 wherein at least two of said time intervals have different durations.

10. The method of claim 1 wherein at least two of said parts are of different size.

11. The method of claim 1 further comprising the step of providing said work in a second form to users for a second fee.

12. The method of claim 1 wherein said work is a textual work.

13. The method of claim 1 wherein said work is a multi-media work.

14. The method of claim 1 wherein said step of providing said consecutive parts for free comprising sending said parts to users via e-mail.

15. The method of claim 14 wherein said parts are sent to a user as e-mail attachments.

16. The method of claim 12 wherein said textual work comprises a book.

17. The method of claim 16 wherein said parts of said work comprise chapters of said book.

18. The method claim 11 wherein said first form comprises a first electronic form and said second form comprises a second electronic form.

19. The method of claim 11 wherein said first form comprises an electronic form and said second form comprises a physical form.

20. The method of claim 19 wherein said second form comprises a printed hard copy book.

* * * * *